United States Patent [19]

Anderson

[11] Patent Number: 5,051,631
[45] Date of Patent: Sep. 24, 1991

[54] ELECTROMAGNETIC SOLENOID VALVE WITH VARIABLE FORCE MOTOR

[75] Inventor: David L. Anderson, Muskegon, Mich.

[73] Assignee: SPX Corporation, Muskegon, Mich.

[21] Appl. No.: 553,893

[22] Filed: Jul. 16, 1990

[51] Int. Cl.⁵ ............................................. F16K 31/06
[52] U.S. Cl. ........................................ 310/14; 310/23;
251/129.08; 251/129.14; 137/625.65
[58] Field of Search ....................... 310/14, 17, 20, 23,
310/66, 67 R; 251/129.02, 129.05, 129.06,
129.14, 129.21; 137/625.65, 625.48

[56] References Cited

U.S. PATENT DOCUMENTS

| | | | |
|---|---|---|---|
| 3,856,260 | 12/1974 | Giordana | 251/129.14 |
| 4,570,904 | 2/1986 | Mullally | 251/129.21 |
| 4,595,035 | 6/1986 | Warrick | 137/625.65 |
| 4,674,536 | 6/1987 | Warrick | 251/129.14 |
| 4,863,142 | 9/1989 | Hendrixon et al. | 251/129.14 |

Primary Examiner—Steven L. Stephan
Assistant Examiner—Matthew Nguyen
Attorney, Agent, or Firm—Barnes, Kisselle, Raisch, Choate, Whittemore & Hulbert

[57] ABSTRACT

An electromagnetic variable force motor circuit comprising a solenoid including a coil, a pole piece associated with the coil and a ball armature. A spring urges the ball armature toward a first seat and away from the pole piece. A first chamber is provided adjacent the first seat, the ball armature and the first seat define a first orifice extending between the ball armature and the first chamber. A first passage provides supply pressure to the first chamber. A second orifice is provided in the first passage. A valve including a movable member responsive to fluid pressure is provided in the first chamber. A second passage provides supply pressure to the valve. A third passage provides control flow from the valve device. A fourth passage provides exhaust flow from the first chamber when the ball armature is moved away from the first seat such that the ball armature controls flow through the first orifice to the fourth passage upon excitation of the coil. The valve is operable to variably restrict flow in the second and third passages.

8 Claims, 5 Drawing Sheets

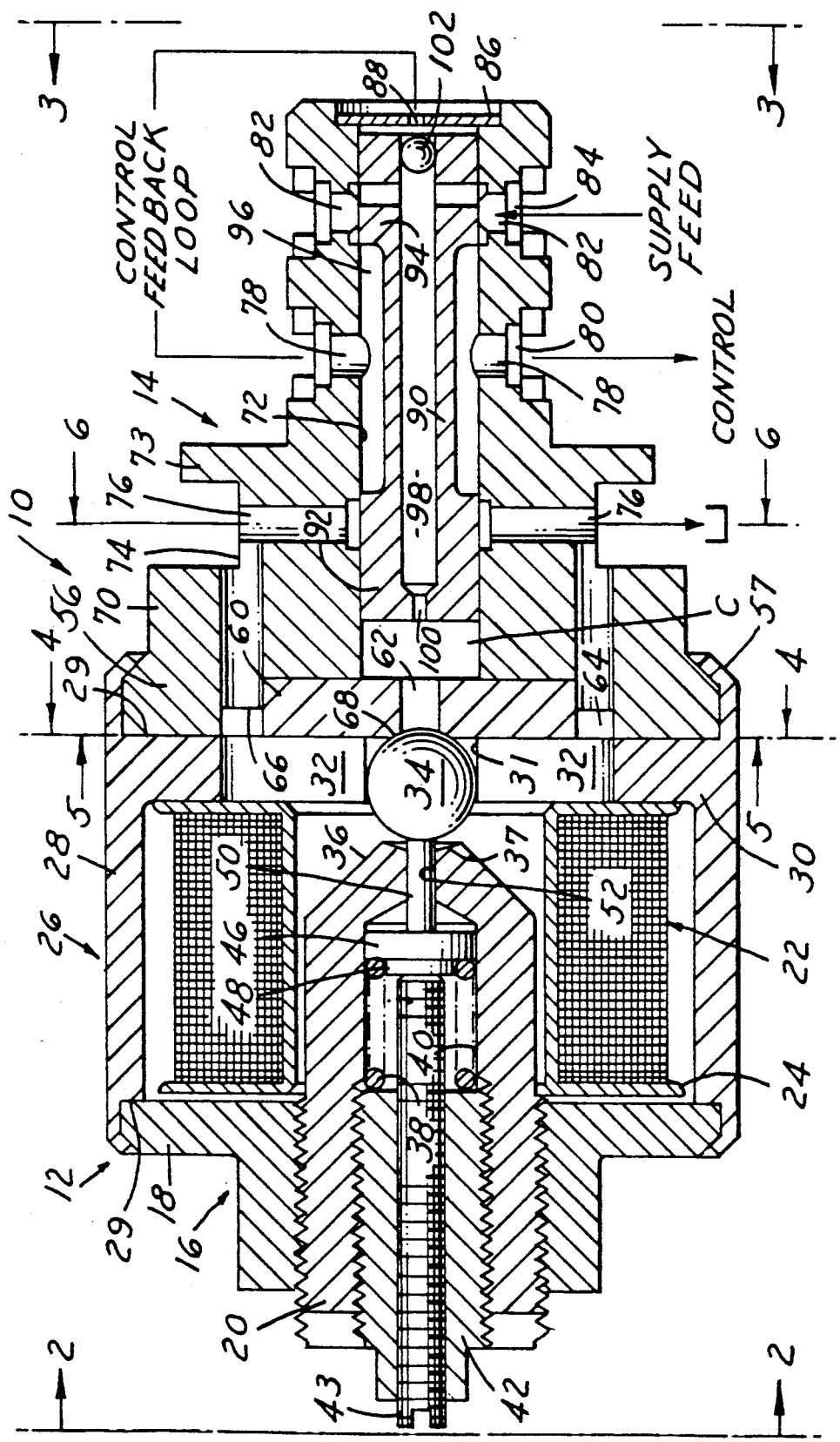

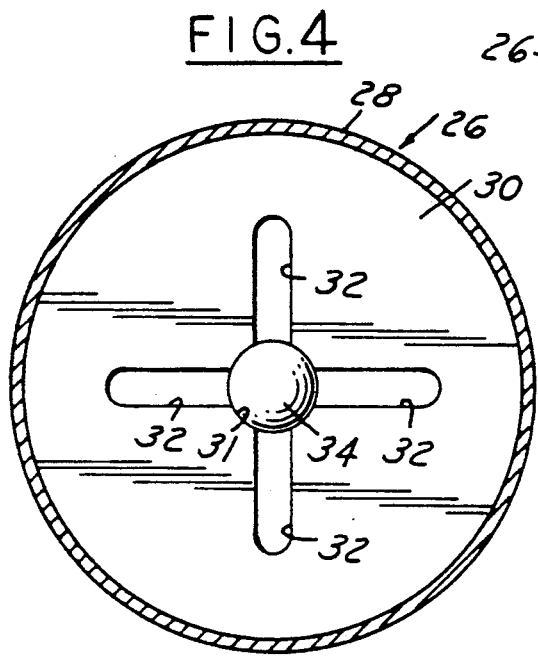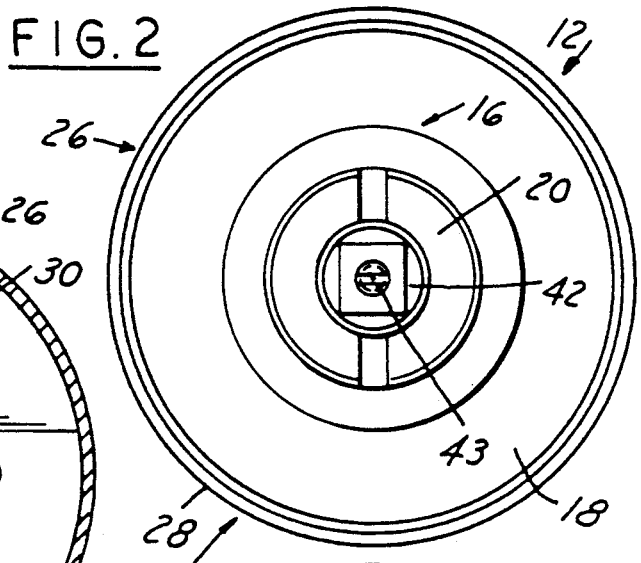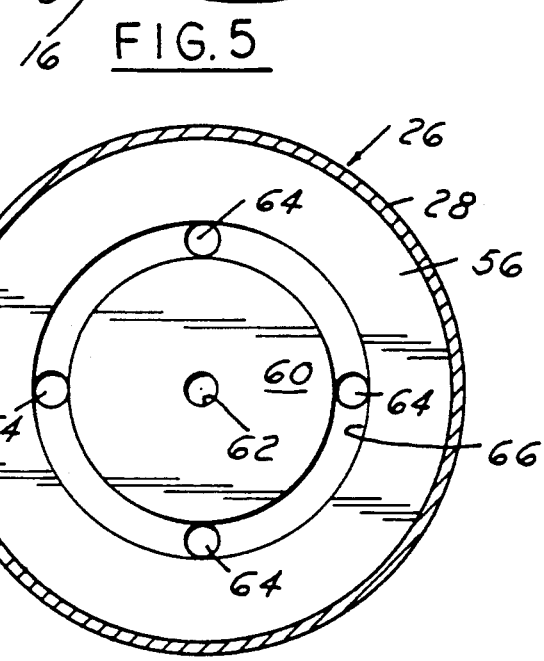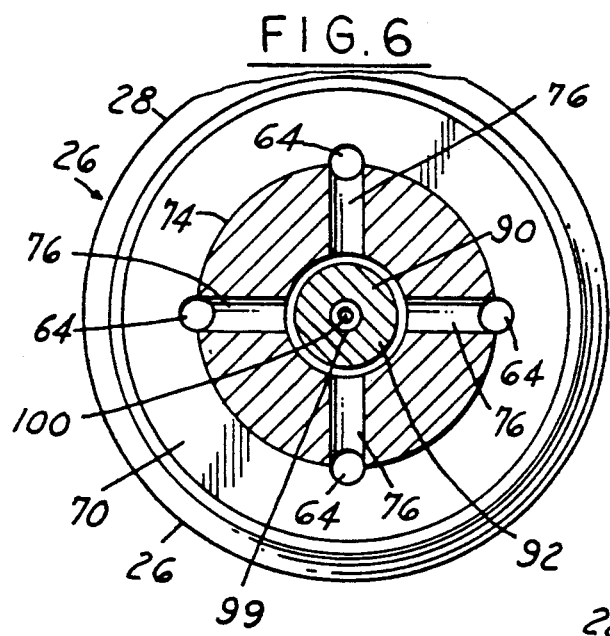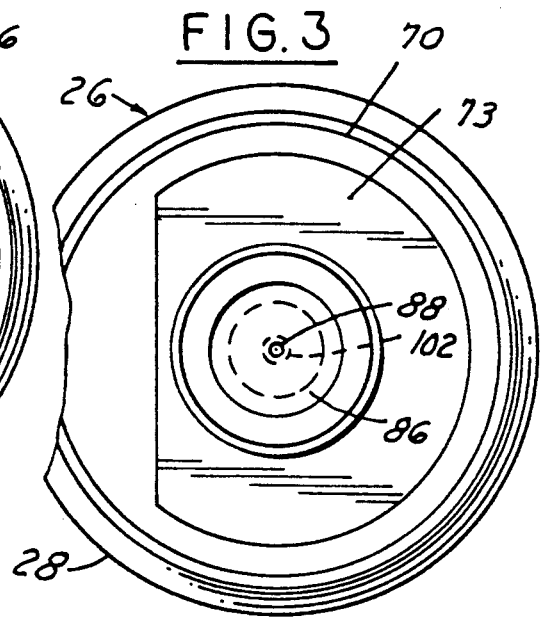

(REPRESENTS FIG.1)

(REPRESENTS FIG.7)

ELECTROMAGNETIC SOLENOID VALVE WITH VARIABLE FORCE MOTOR

This invention relates to electromagnetic variable force motors, and more particularly to a solenoid valve embodying such a motor for variably controlling pressure and/or flow of fluid.

BACKGROUND AND SUMMARY OF THE INVENTION

Electromagnetic variable force motors of the subject type include a pole piece having a central structure surrounded by a coil, an armature positioned for motion toward and away from the pole piece, and a spring for urging the armature away from the pole piece. The pole piece and armature are of ferromagnetic construction so that current in the coil establishes a magnetic field in the pole piece, attracting the armature toward the pole against the force of the spring. Sliding friction between the armature and surrounding structure, only partially reduced by armature guide and bushing structures, results in energy loss and position hysteresis between the armature and pole piece. Furthermore, armature and pole piece structures contoured to obtain a desired force characteristic relative to coil current are often complex and expensive to manufacture. One exemplary solenoid valve embodying a linear force motor of the described character is disclosed in U.S. Pat. No. 4,579,145.

U.S. Pat. Nos. 4,570,904 and 4,595,035, both assigned to the assignee hereof, disclose solenoid-operated modulating valves in which a ball of ferromagnetic construction serves as both the solenoid armature and the on/off valve element. A coil spring is captured within a central cavity in the pole piece and has an end tine which extends through a passage in the pole face to engage the ball and position the ball in normally-closing engagement with an opposing fluid passage valve seat spaced from the pole piece. The face of the pole tapers narrowingly in the direction of the ball for enhanced magnetic coupling therebetween. Fluid flow through the valve is controlled by pulse width modulation of the coil drive signal. Although the modulating valves so disclosed have enjoyed substantial acceptance and success, they often cannot substitute or satisfy requirements for variable force motor type solenoid valves.

In U.S. Pat. No. 4,863,142 and application Ser. No. 324,312 filed Mar. 16, 1989, having a common assignee with the present application, a solenoid valve with a force motor is disclosed and claimed. The electromagnetic variable force motor comprises a pole piece of ferromagnetic construction and an electrical coil coaxially surrounding the pole. The motor armature comprises a ball of ferromagnetic construction positioned coaxially with the pole. The ball-armature and pole have a preselected characteristic (typically empirically preselected) of magnetic attractive force between the armature and pole that is a function of ball armature size and armature travel or gap between the ball armature and opposing pole face when current is applied to the coil. Ball size and armature travel are selected in a manner such that the magnetic attractive force is compatible with the desired management characteristic for the flow and pressure requirements. A spring engages the ball-armature and urges the same away from the opposing pole face. The spring has a spring rate which is substantially identical to the magnetic-force/generated between the pole piece and ball-armature. That is, magnetic attractive force caused by a given current in the coil and a corresponding reduction in the armature/pole piece air gap is substantially identically balanced by a change in compression and corresponding force in the spring. Most preferably, such armature/pole piece force characteristic and spring rate are both substantially linear, such that displacement of the ball-armature with respect to the pole piece against force of the spring varies substantially linearly with current to the coil.

In the aforementioned patents and applications, a housing encloses the pole piece and armature and has journalling surfaces which surround the ball-armature, guiding axial motion thereof while limiting motion transversely of the pole piece axis. The structure which transmits the spring force to the ball-armature is configured so as to limit contact with the surrounding pole piece and housing. There is thus limited contact and friction between the moving elements of the force motor—i.e., the ball-armature and spring force-transmitting element—and the surrounding housing. As a result, hysteresis in ball-armature position versus current is substantially eliminated.

These solenoid valves comprise a valve body having a bore with a central axis and fluid passages extending radially or transversely therefrom. A valve element is axially slidably captured within the bore and cooperates with the valve body passages for varying flow of fluid therethrough. A housing of ferromagnetic material is mounted on the valve body, and includes a ferromagnetic pole piece coaxially with the bore and an electrical coil circumferentially surrounding the pole piece. A ball-armature is positioned in coaxial opposition to the pole in engagement with the valve element, and a spring is positioned to engage the ball-armature to urge the same away from the opposing face of the pole piece. The valve element, which is preferably constructed separately from the ball-armature, comprises a valve spool in the preferred embodiments of the invention having axially spaced lands which cooperate with the valve body passages extending from the central bore. The solenoid valve is constructed and arranged so the air gap can be readily adjusted and the calibration can be readily achieved.

Although these devices operate satisfactorily, they function in a different manner, namely, inasmuch as the force motor has the ball armature in contact with the spool, spool position is dependent upon ball position. Such a control is effective but is subject to the limitations of dimensional variations that cause stack-up or accumulation of tolerances, making the manufacture more critical. In addition, the provision of a spring acting on the spool to counteract opposing spool forces causes friction in the spool movement resulting in hysteresis. Thus, where a spring is utilized to urge the ball and the spool to a predetermined position, the extent of compression of the spring varies the force on the ball. Another potential problem with such prior devices is that inasmuch as there is minimal flow about the ball, there is risk of contamination which will adversely affect operation and durability, as might occur in hydraulic fluid, for example, in an automotive transmission.

Among the objectives of the present invention are to provide an electromagnetic solenoid valve with variable force hydraulic motor which has less inertia and hysteresis; wherein provision is made for metering the exhaust from the valve to lower the cavity pressure under which the spool of the valve is operating, thereby making the valve more responsive and less subject to inertia; wherein the operation will not be adversely affected by force of any spring on the ball; wherein higher hydraulic forces can be provided to minimize hysterisis from friction; and wherein operation is not adversely affected by contaminants in the hydraulic fluid.

In accordance with the invention, the electromagnetic solenoid valve with variable force motor the spool position is controlled hydraulically and independently of the ball position on the variable bleed force solenoid without the need for a spring acting on the spool.

Further in accordance with the invention, a ball armature is yieldingly urged against an orifice seat and is adapted to be moved away from the orifice seat against the action of a spring. A valve spool is associated with the orifice controlled by the ball and is adapted to be moved by the differential pressure caused by the lowering of pressure when the ball armature is moved away from the exhaust seat due to energization of the solenoid.

BRIEF DESCRIPTION OF THE DRAWINGS

FIG. 1 is a partly schematic longitudinal sectional view diametrically bisecting a solenoid valve configured as a pressure control valve in accordance with one presently preferred embodiment of the invention;

FIG. 2 is an end elevational view of the solenoid valve of FIG. 1, taken along the line 2—2 in FIG. 2;

FIG. 3 is an end view taken along the line 3—3 in FIG. 1;

FIG. 4 is a sectional view taken along the line 4—4 in FIG. 1;

FIG. 5 is a sectional view taken along the line 5—5 in FIG. 1;

FIG. 6 is a sectional view taken along the line 6—6 in FIG. 1;

DETAILED DESCRIPTION OF THE PREFERRED EMBODIMENTS

Figure 7:
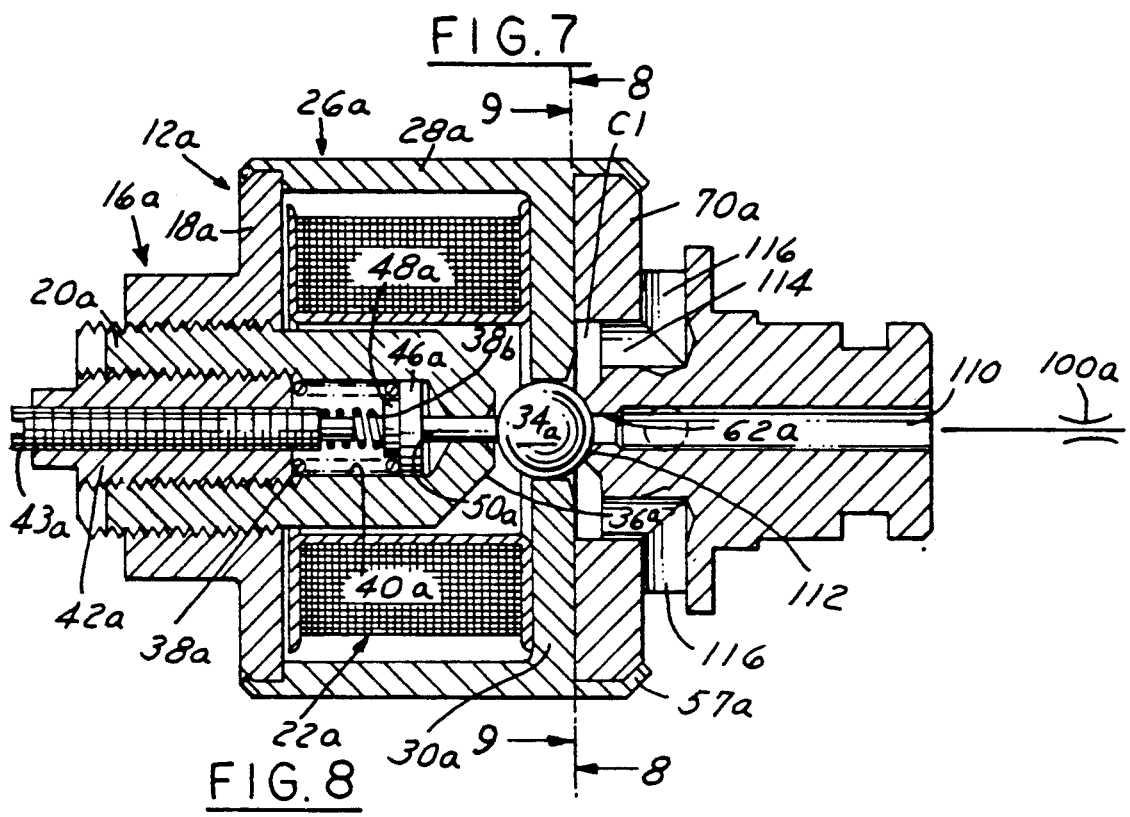
FIG. 7 is a partially schematic longitudinal section view of a modified form of solenoid valve.

FIGS. 1-6 illustrate an electromagnetic variable force motor system 10 in accordance with a presently preferred embodiment of the invention as comprising an electromagnetic variable force motor 12 and a valve device 14. Force motor 12 includes a pole piece assembly 16 having a base 18 of ferromagnetic material. A substantially cylindrical pole piece 20 of ferromagnetic material is adjustably threaded into base 18 of pole piece assembly 16 and extends from base 18 and is circumferentially surrounded by an electrical coil assembly 22, including electrical wire wound on a suitable bobbin 24. A housing 26 of ferromagnetic material has a peripheral wall 28 which encloses coil assembly 22. Wall 28 engages a shoulder 29 on housing 26 and the free edge of housing 26 is crimped or otherwise formed over the periphery of base 18. Housing 26 includes a flat base wall 30 at its other end which is parallel to base 18. The other end of housing 26 is also formed with a shoulder. The axial length of pole 20 is less than the axial length of coil assembly 22 and side wall 28, so that pole piece 20 is separated and spaced from opposing base 30 by an air gap. Base wall 30 is integral with peripheral wall 28 intermediate the ends of wall 28 and extends transversely. Base wall 30 includes a central opening 31 and radial slots 32 extending from opening 31 (FIG. 4).

An armature 34, preferably consisting of a solid spherical ball of ferromagnetic construction, is slidably captured within a central opening 31 in base wall 30 coaxially with pole piece 20. There is thus formed a magnetic flux generated by coil 22 in a closed magnetic path through pole piece 20, pole piece base 18, peripheral wall 28, base wall 30, ball armature 34 and the air gap between ball-armature 34 and pole piece 20. The axially oriented frustoconical face 36 of pole 20 tapers narrowingly toward ball 34 to focus the magnetic flux at pole face 37. The preferred angle of taper of outer face 36 is about 45° on a cone of revolution centered on the pole axis. Inner pole face 37 immediately opposite ball-armature 34 approaches the pole face 37. Ball armature 34 is of a size such that at least half of the ball volume remains within opening 32. Stated differently, axial separation between pole face 37 and housing base 30 is less than one-half of the diameter of ball armature 34. In this way, the magnetic discontinuity between ball-armature 34 and housing base 30 remains substantially constant throughout motion of the ball-armature, and does not affect linearity of such motion as a function of magnetic force and stator current.

A coil spring 38 is captured in compression within a central axially-extending cavity 40 in pole piece 20 between a member 42 threaded into pole piece 20 and a pintle 46 for transmitting force from spring 38 to ball-armature 34. A central boss 48 extends from the base of the pintle body into the coils of spring 38 in close-fitting relationship therewith for maintaining position of the pintle 46 centrally of the spring 38. A finger or pin 50 extends from the opposing end of pintle 46 through a central passage 52 in end of the pole piece 20 into opposed abutting engagement with ball-armature 34 coaxially with pole 20 and ball armature 34. The outside diameter of pintle 46 is less than the inside diameter of cavity 40, and the pintle pin 50 is slidably positioned in passage 52. Pintle 46 is preferably of non-magnetic construction, but not restricted to non-magnetic materials. An adjustment screw 43 limits the axially outward movement of pintle 46.

Although the pole piece assembly is shown as comprising a base 18 and an adjustable pole piece 20, the pole piece can be made in one piece.

Valve body 14 is preferably made of non-magnetic construction but is not restricted to non-magnetic materials and has an outer end flange 56 engaging a shoulder 29 on other end of the housing 26. An encompassing flange 57 on housing 26 surrounds and is crimped or otherwise formed over the periphery of valve body flange 56 to form the unitary valve assembly 10. Body 14 supports an integral transverse orifice wall 60 of nonmagnetic material which has a central opening 62 aligned with opening 31, circumferentially spaced axial openings 64 spaced from opening 62 and an annular groove 66 connecting openings 64 (FIG. 5) and facing slots 32 in wall 30. Wall 60 includes a frustoconical seat 68 which is normally engaged by ball armature 34.

Valve body 14 includes an integral axial portion 70 extending axially outwardly from wall 60 and having a bore 72. Axial portion 70 includes an intermediate radial wall 73 defining a peripheral annular groove 74 which communicates with the axial openings 64. Circumferentially spaced passages 76 (FIG. 6) extend from bore 72 to groove 74. Additional circumferentially spaced radial passages 78 in body 14 extend from bore 72 to an intermediate annular peripheral groove 80 and circumferentially spaced passages 82 extend from bore 72 to an annular groove 84. The end of bore 72 is closed by a plate 86 having an orifice 88 therein.

A spool 90 is provided in bore 72 and includes spaced lands 92, 94 defining an annular peripheral groove 96 in the spool 90. Spool 90 also includes an axial passage 98 which communicates with an orifice 100 at the end 92 thereof adjacent passage 62. The other end of passage 98 is closed by a press fitted ball 102 adjacent plate 86. The volumeric space defined by passage 62 and the space adjacent the end 92 of spool 90 comprises a chamber C.

Referring to FIG. 1, the valve may be provided in a manifold or other configuration of housing wherein the passages 76 extend to exhaust or tank, the passages 82 provide for supply feed and the passages 78 and 88 are connected to provide a control feedback loop.

The electromagnetic solenoid device thus has a ball armature 34 that varies in position about the exhaust orifice between the ball armature and seat 68 in proportion to the current being applied. As the current to the coil is increased, the ball armature 34 is pulled further off the seat 68 increasing the annular orifice between opening 62 and slots 32, increasing the effective flow area;, and resulting in a lower chamber pressure in chamber C acting against the spool 90. The chamber pressure is inversely proportional to the current applied. As the current increases and chamber pressure in chamber C decreases, the spool 90 will shift in a direction to cause land 94 to close the metering edge of the supply port 82 until the control feedback pressure from passages 76 and orifice 88 balances with chamber pressure. The control pressure from the spool valve 90 is thus inversely proportional to the current applied.

As the supply pressure varies, the control feedback pressure changes to balance the chamber pressure at the opposite end of the spool 90 maintaining a force balance for a desired control pressure. By definition, the control pressure and control feedback pressure always equal the chamber pressure in chamber C.

Pressure Balance Relationship

If the chamber pressure falls below the feedback pressure (control pressure) due to a reduction in supply pressure or the ball armature 34 being pulled further off the exhaust seat, then the spool 90 will shift in a direction toward the lower pressure, causing land 94 to thus close the annular supply opening 82 that feeds the control passages 80. The spool 90 will continue to shut down until the control feedback pressure again equals the chamber pressure.

If the chamber pressure exceeds the calibrated feedback pressure (control pressure) due to supply pressure increasing, the ball armature 34 will move further off the exhaust seat 68 to reduce the excess pressure and maintain the calibrated control pressure.

If a large flow demand occurs, such as during a transmission clutch fill command, with supply constant there will be a reduction in control pressure due to the demand. The same pressure reduction is felt in the control feedback pressure line due to the inter-relationship with the design. The reduction creates an unbalance between the feedback and chamber end of the spool 90. The spool 90 will move in the direction of low pressure which is toward the feedback end of the spool. As the spool shifts, it will open the supply enough to bring the feedback pressure back to a balance point with the chamber pressure.

The spool 90 is thus constantly seeking a position of pressure balance between the feedback end and chamber end of the spool to maintain a regulated control pressure.

Initial Calibration

Initial calibration for a specific control pressure is obtained by adjusting the initial spring preload of spring 38. For example, in a device calibrated at 90 psi control pressure when supplied with 120 psi, control pressure is regulated at 90 psi for any increase in supply pressure above the 120 psi. In other words, supply pressure increases up to 250 psi will have relatively no effect on the 90 psi control pressure. This insensitivity to supply pressure fluctuations exists for all operating current levels.

Operation

With no current applied to the coil and a device having initial calibration of, for example, 90 psi control and 120 supply, as the supply pressure increases, the flow into the chamber C will increase, creating a pressure rise at the chamber end of the spool. This pressure rise exerts a higher force on the ball armature forcing it farther off the exhaust seat orifice. When the armature moves off the seat, it exhausts the additional flow coming through the small orifice 100 of the spool 90. Thus, it maintains a relatively constant chamber pressure in chamber C. The responsiveness of the spool 90 to maintaining a constant chamber pressure is associated with the short effective ball armature 34 travel and low spring rate.

A supply increase creates a momentary control pressure and control feedback pressure increase. The latter causes the spool 90 to shift and close down the metering edge of land 94 of the supply port 82 until the control pressure and feedback pressure balance with the chamber pressure. The end result is a smaller supply opening to counteract the supply pressure increase.

With a current change to the coil and a device having initial calibration of, for example, 90 psi control and 120 psi supply, after initial calibration has been made, as the current to the coil is increased, the ball armature 34 is pulled further off the exhaust seat 68. This increases the effective flow area and with small cavity feed orifice 100 in the spool 90 being fixed, the combination results in lowering the chamber pressure. The lower chamber pressure creates a force inbalance on the spool 90 causing the spool 90 to shift in the direction of lower pressure. Thus, the metering edge of land 94 of the supply port 82 closes down until the control pressure and feedback pressure balance with cavity pressure.

Figure 8:
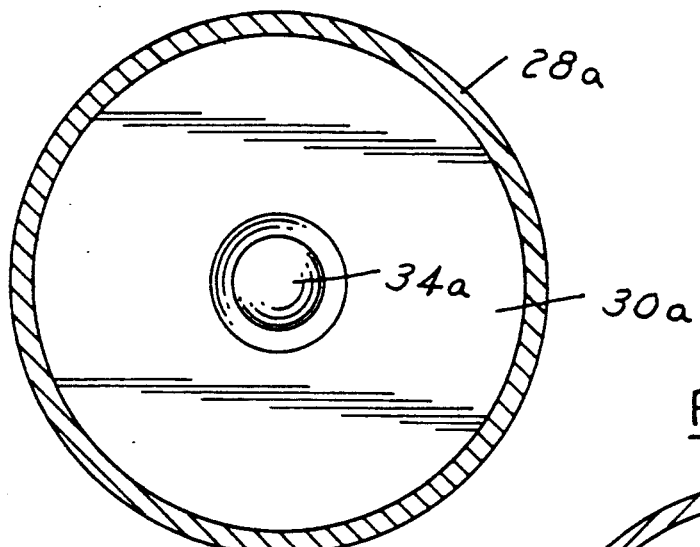
FIG. 8 is a sectional view taken along the line 8—8 in FIG. 7.
Figure 9:
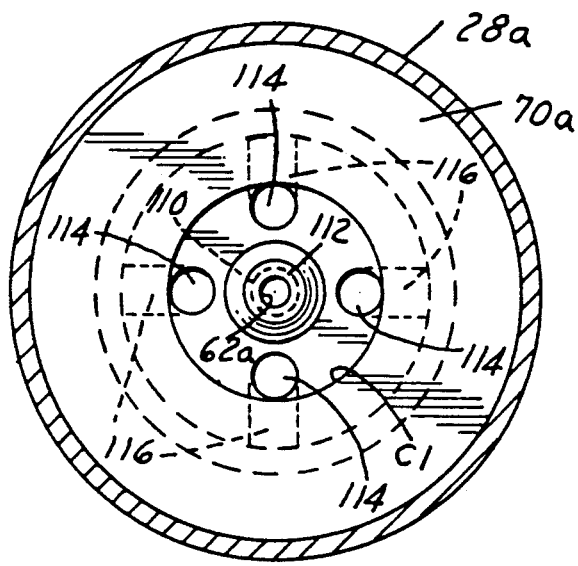
FIG. 9 is a sectional view taken along the line 9—9 in FIG. 7.

Referring to FIGS. 7-9, there is shown a modified electrohydraulic solenoid valve which is adapted to be used with a valve, not shown, which functions in a manner similar to that of the aforementioned valve 14. In this form, corresponding parts are referred to with a suffix "a". The electrohydraulic solenoid is associated with an axially extending member 70a that has a central passage 110 terminating in an orifice 62a adjacent the ball armature 34a. The member 70a includes a frustoconical seat 112 that defines a chamber C1 which communicates through passages 114 which extend axially to radial passages 116 that in turn pass to exhaust. The passage 110 is adapted to extend to one end of a spool of a spool valve that functions in a controlled manner comparable to that of the previously described valve 14. In this form, the orifice 100a is not in the spool but is provided externally of the valve device.

Figure 10:
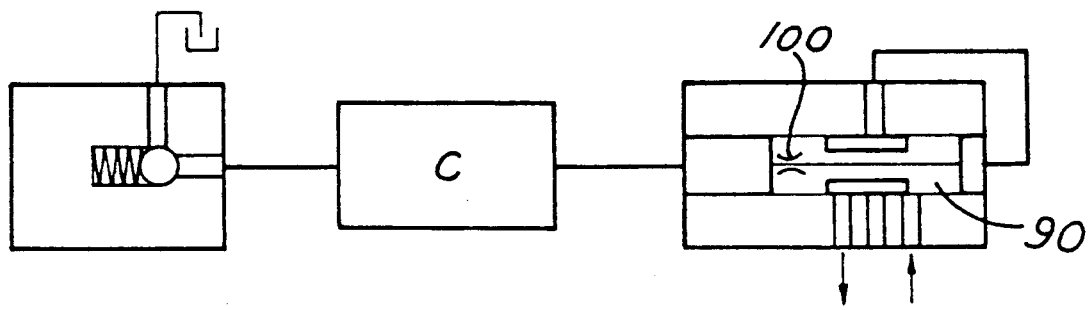
FIG. 10 is a schematic of the electromagnetic variable force motor and hydraulic valve system.
Figure 11:
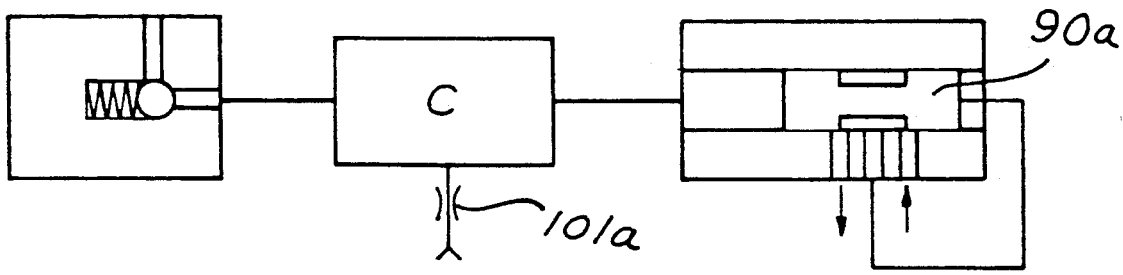
FIG. 11 is a schematic diagram of the system shown in FIG. 7.

Thus, referring to the schematic diagram shown in FIG. 10, which is a simplified diagram of the system of FIG. 1, the orifice 100 is internally provided in spool 90. In the diagram shown in FIG. 11, which is a schematic diagram of the system shown in FIG. 7, the orifice 100a is external of the spool 90a.

It has been found that in some systems, the spring force of spring 38 or 38a opposing the movement of the ball armature 34, 34a may be insufficient to insure proper fluid pressure as the ball armature is lifted from its seat and will therefore not provide a proper performance curve of fluid pressure in its movement such that it has high hysteresis or the ball armature may move in an erratic vibration or chattering manner. It has been found that if an increasing spring force is provided, as the ball moves away from the seat, the proper performance may be achieved. As shown in FIG. 7, this may be achieved by a second spring 38b which is stronger than spring 38a and becomes effective after a predetermined movement of the ball armature 34a away from its seat. A similar spring may also be used in the form shown in FIG. 1.

Figure 12:
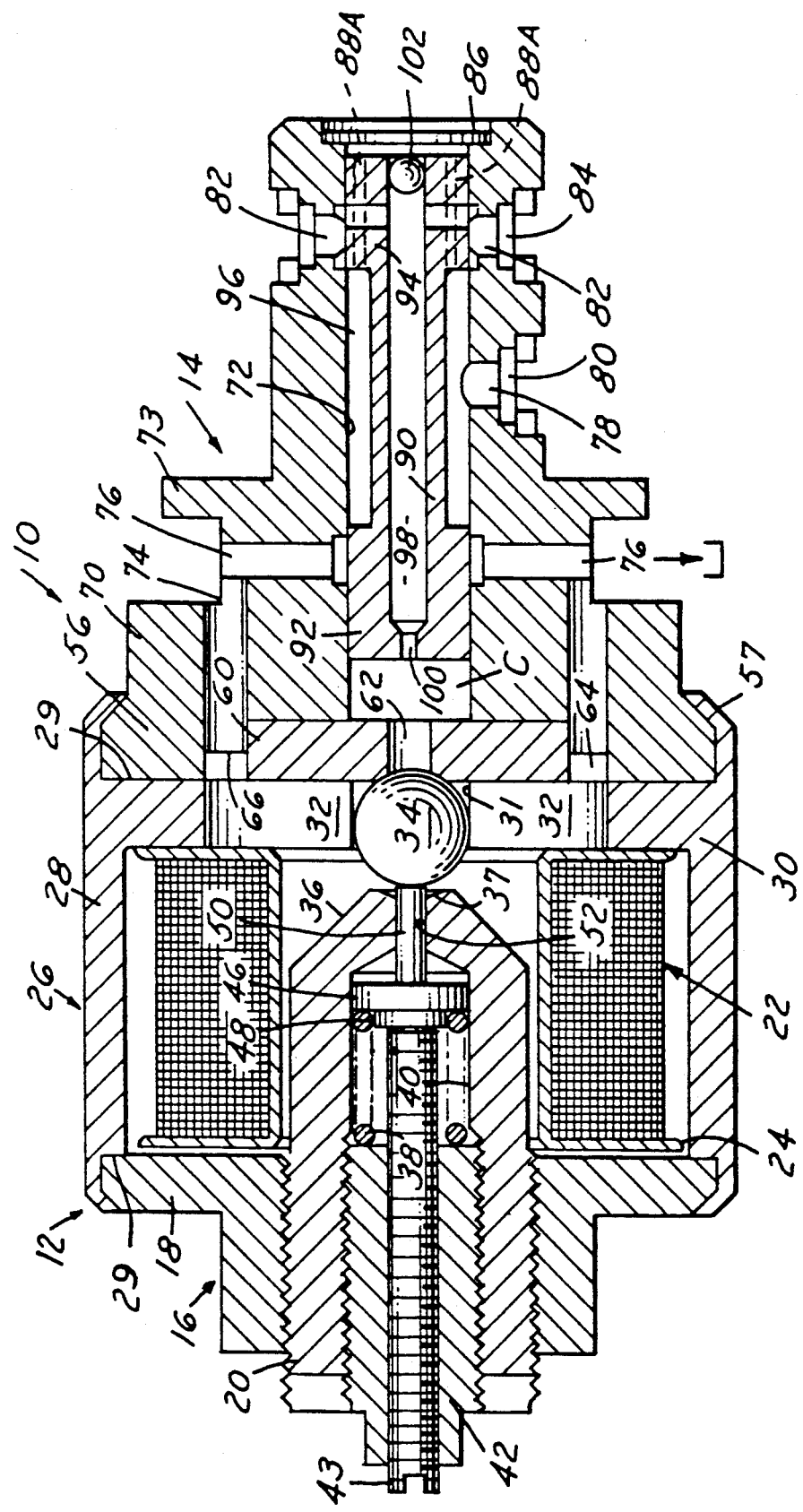
FIG. 12 is a longitudinal sectional view of a further modified form of the invention.

The form shown in FIG. 12 is identical to that shown in FIG. 1 except that the passage 78, orifice 88 and the feedback loop are eliminated and replaced by internal passages 88a in land 94 of spool 90 between the groove 96 and the outer end of spool 90.

It can thus be seen that there has been provided an electromagnetic solenoid valve with variable force motor which has less inertia and hysteresis; wherein provision is made for metering the exhaust from the valve to lower the cavity pressure under which the spool of the valve is operating, thereby making the valve more responsive and less subject to interia; wherein the operation will not be adversely affected by force of any spring in the ball; wherein higher hydraulic forces can be provided to minimize hysteresis from friction; and wherein operation is not adversely affected by contaminants in the hydraulic fluid.

I claim:

1. An electromagnetic variable force motor circuit comprising:
    a solenoid including
    a coil,
    a pole piece associated with said coil,
    a ball armature,
    means defining a first seat,
    spring means urging said ball armature toward said first seat and away from said pole piece,
    means defining a fluid chamber adjacent said first seat,
    said ball armature and said first seat defining a first orifice extending between said ball armature and said fluid chamber,
    first passage means for providing supply pressure to said fluid chamber,
    means defining a fixed second orifice associated with said first passage means,
    a valve device including a movable member spaced from and out of contact with said ball armature at all times and positioned adjacent the fluid chamber so that it is responsive to fluid pressure in said fluid chamber,
    second passage means for providing supply pressure to said valve device urging said movable member toward said fluid chamber,
    third passage means for providing control flow from said valve device,
    fourth passage means for providing exhaust flow from said fluid chamber when said ball armature is moved away from said first seat such that said ball armature controls flow through said first orifice to said fourth passage means upon excitation of said coil,
    said device being operable to variably restrict flow in said second and third passage means.

2. The electromagnetic variable force motor circuit set forth in claim 1 wherein said valve device comprises a spool valve having a spool, said first passage means being provided in said spool and extending axially to one end, said second orifice being positioned in said one end of said spool.

3. The electromagnetic variable force motor circuit set forth in claim 2 wherein said spool includes radial openings which are selectively moved into communication with said second passage means supplying supply pressure to said valve.

4. The electromagnetic variable force motor circuit set forth in claim 3 wherein said second passage means, third passage means and fourth passage means are provided in said body of said valve, said fourth passage means communicating with the area surrounding said ball armature.

5. The electromagnetic variable force motor circuit set forth in claim 4 wherein said solenoid includes radial passages extending from about the ball armature outwardly, said valve body including axial passages communicating with said radial passages and defining said fourth passage means.

6. The electromagnetic variable force motor circuit set forth in claim 5 including an annular passage providing communication between said axial passages.

7. The electromagnetic variable force motor circuit set forth in claim 1 wherein said valve device comprises a spool valve having a spool, said means for providing fluid to said second orifice means is external of said spool.

8. The electromagnetic variable force motor circuit set forth in claim 1 wherein said valve device comprises a spool valve having a spool, said means for providing fluid to said second orifice means is internal of said spool.

* * * * *